United States Patent [19]

Kraushaar et al.

[11] 4,008,754
[45] Feb. 22, 1977

[54] PROCESS FOR THE CONSERVATION OF ISOLATED ORGANS AND THE LIKE

[75] Inventors: Jürgen Kraushaar, Launsbach; Rolf Voss, Giessen, both of Germany

[73] Assignee: Messer Griesheim GmbH, Frankfurt am Main, Germany

[22] Filed: Aug. 6, 1975

[21] Appl. No.: 602,420

[52] U.S. Cl. .................................. 165/2; 62/62; 62/78; 195/1.7; 426/246; 426/418
[51] Int. Cl.² ........................................... F25B 13/00
[58] Field of Search .................. 62/62, 63, 64, 78; 165/2, 58; 195/1.7, 1.8; 426/237, 241, 242, 246, 418

[56] References Cited

UNITED STATES PATENTS

| 3,470,942 | 10/1969 | Kudada et al. | 62/78 X |
| 3,677,024 | 7/1972 | Segall | 62/64 |

*Primary Examiner*—Ronald C. Capossela
*Attorney, Agent, or Firm*—Connolly and Hutz

[57] ABSTRACT

Organs or parts of organs are conserved by being rinsed with an inert gas or mixture until they are free of water and blood. Their vascular systems are filled at slight excess pressure of an inert gas or gas mixture, and finally the organs or parts are cooled at excess pressure in an inert gas atmosphere to a temperature below −100° C and are stored at this temperature.

12 Claims, No Drawings

PROCESS FOR THE CONSERVATION OF ISOLATED ORGANS AND THE LIKE

BACKGROUND OF THE INVENTION

It is known that the conventional frozen meat is, compared with fresh meat, of lower quality because, upon freezing, the cell walls are destroyed by the crystallizing cell liquid. Upon thawing, the tissue water runs out which causes considerable losses in taste.

Because of this damaging of the tissue, it has, up to now, not been possible in medicine to use low-frozen organs or parts of organs, after their thawing, for transplantations, since the tissue is completely necrobiotic. On the other hand, there exists especially in the medical field a considerable necessity to conserve organs, which have been taken out for a longer period of time, in order to be able to carry out the transplantation, at the receiver, at an optimum point of time. The ability to have some storage life would, in any case, be of advantage.

For the transplantation of a kidney in the humane medicine of humans and animals, there are available today e.g. a maximum of about 24 hours, between the taking out and the transplanting, whereby the kidney is kept alive with the help of expensive processes. After the removal, there must be carried out, via donor blood and tissue samples, different compatibility tests, whose results determine if that kidney can be successfully transplanted and to what receiver type. This test result is communicated to a central registrator for potential receivers, when thereafter, a patient is found being of suitable type. After corresponding communication to the donor- and receiver clinic, the transplantate or organ is sent on the one side, and the preparation of the patient and of the operation on the other. When by these measures, the basic time being available, has passed, the kidney has to be rejected, notwithstanding of all trouble and costs that have ensued.

Therefore, it can already be considered a great advance that through Belzer's continuous perfusion process the maximum time, which is available for all above-mentioned preparations, has been extended from 6 hours to 24 hours. This process is based on a cooled, mechanical, pulsating permanent perfusion, with a special perfusion solution, whose manifold change and modification in the last years could, however, heretofore produce no considerable extension of the tolerance time.

If it would now become possible to prolong this short time of 24 hours considerably, there would not only be taken away the hecticness from all preparatory measures for the transplantation, but also a differentiated typisation process could be applied, whose use was impossible up to now, because it required or had a duration of one week. The psychic preparation of the receiver could be carried out more carefully and the actual operation accomplished utilizing current conventional processes. Moreover, no suitable organ would have to be rejected because, as now, there is not the right timing for finding a compatable receiver or, e.g., the receiver is not in sufficiently good health at the time to justify the risk of the operation.

The above considerations prove true not only for kidneys but also for other organs. Therefore, the degree of activity of the technique of the transplantation surgery could be increased decisively by extending the time of survival of the isolated organs or parts of organs. However, this extension of survival time is possible only by a complete or at least almost complete interruption of all metabolism proceedings in the transplantate itself. However, according to todays knowledge, the metabolic procedures could be stopped only at temperatures below $-100°$ C. However, at such a cooling, the tissue will be destroyed in all known processes, so that it will no longer be useful for a transplantation.

It would be a great step forward, not only in the medical field, but also in the field of the conservation of provisions, if it would become possible to conserve meat by the application of low temperatures so that after thawing such meat could practically not be differentiated from the fresh meat.

SUMMARY OF THE INVENTION

The invention is based on the problem, to create a conservation process for isolated organs or parts of organs, at which the organs can be frozen so that after the thawing out again they can practically not be distinguished from fresh organs and can be transplanted.

Now, a process has been found for the conservation of isolated organs or parts of organs, by the use of low temperatures, by which according to the invention, the organs or parts of organs are rinsed with an inert gas or gas mixture, until they are free of water and free of blood, and that when the vascular systems and possibly the hollow spaces are filled at a slight excess pressure, with gas or gas mixture, and finally the organs or parts or organs, which are filled with the gas or gas mixture, are cooled at excess pressure under an inert gas atmosphere to a temperature below $-100°$ C, and are stored at this temperature.

As an inert gas or gas mixture for the rinsing, helium has been found very suitable. As an inert gas atmosphere for the cooling, helium, nitrogen or mixtures of helium and xenon or helium, xenon, and sulfur hexafluoride can be used. The thawing out of the organs having been conserved according to the invention, is somewhat difficult, since thereby the perfectly frozen organs can thereby easily be damaged. It has been found advantageous to carry out the thawing out by irradiation with microwaves in intervals. Most experiences with the process of conservation of the invention are available up to now with kidneys. Successfully treated were also in the animal test arterial blood vessels, hearts, livers, and tongues.

According to the experiences being available up to now, utilizing the process of the invention, it seems besides, that the individual immune-codes of the organs or organ parts are changed considerably. The process according to the invention is of interest not only for the transplantation medicine, but also for the conservation of provisions. As the positive morphological findings show clearly, it is in the case of rethawed tissue parts, not a case of frozen meat in the conventional sense, but of regular fresh meat. Because of the high costs, the conservation of provisions would be considered now only for expensive delicacies. As the experience shows, the costs drop in the course of time, in particular for large-scale application in almost all new processes. Therefore, observed for a long period, the invention offers a method for long time storage of real fresh meat. It would then finally be possible to stabilize the market and to compensate the strong, periodic fluctuations of today in the offer of fresh meat.

DETAILED DESCRIPTION

The excellent suitability of the process, according to the invention, for the conservation of organs or parts of organs, becomes evident from the following exemplified embodiments which refer to the conservation of two pig kidneys. Both kidneys originate from the same animal, and were taken out in the slaughterhouse by a butcher en bloc. The time between the death of the animal and the taking out of the organ, could not, as in all similar cases, be established. Since, however, in the meantime, the pig had be scoured, shaved, divided, and taken out, one has to calculate with a warm ischemic period, from half an hour to a whole hour, especially, since in the organusatoric course of the slaughtering, uncontrollable pauses occur, in which the band is simply shut off. All together, therefore, the conceivably worst conditions for the obtaining of transplantable organs, especially since both kidneys were kept for two hours in ice, until the continuation of the treatment. Thereafter, they were prepared freely and the one (K 19) was rinsed free of blood by means of cooler (+4° C) gravity perfusion (1000 ml. of Ringer solution + 2.5 ml. Liquemin). In the case of the other (K 20), there was used under the same conditions 1000 ml. of so-called Collin's solution. The duration of the perfusion amounted for the one (K 19) 87 min., for the other (K 20) 57 min. for always 1000 ml.

To examine the vascular system and for the conditioning of the organs, they were subjected only to a mechanical, pulsating permanent perfusion (K 19—3 hrs., K 20—3.5 hrs). The perfusion solution consisted thereby essentially of 10% rheomacrodex with Liquemin and OH-ion-excess.

The amount flowing through amounted for both kidneys to 180 ml./min. After 2.5 hrs. the pressure, which had to be applied to maintain this flow, amounted for K 19 84/62 Torr (perfusion No. (PZ : 2.46), for K 20 95/75 Torr (PZ : 2.11). After that K 19 showed constant behavior, K 20, with respect to the pressure, dropping tendency (up to PZ : 2.6). By perfusion No. there is thereby to understand the relation from flow passing through per minute to the medium pressure, with omission of the dimensions.

After the machine perfusion, the vascular system of both kidneys was rinsed according to the invention about 10 min. via its arterial connection with helium under a pressure of 100 Torr until it was free of water, consequently, for the maintenance of a slight excess pressure, veins and arterial stump closed. Then, above the ureter, the kidney base was filled to 50 Torr with helium and closed.

The kidneys, thus prepared, were then introduced jointly into a container being impermeable to gas, and were then stored therein under nitrogen with a pressure of 2 atU. The whole system was cooled by dipping it into liquid air, where it was stored for more than 16 hrs. Then the container was opened, the kidneys taken out, and thawed again by irradiation at intervals with microwaves. The thawing process took for K 19 about 1 hour, for K 20 55 min.

Subsequently, both preparations were subjected to a new machine perfusion. Its procedure was the same as the preceding one.

The amount flowing through amounted for both kidneys again 180 ml./min. The respective pressure amounted always after 60 min. for K 19 54/34 Torr (PZ : 4.09), for K 20 90/75 Torr (PZ : 2.18). K 19 showed again a constant behavior, K 20 a dropping tendency (to PZ : 2.70).

For the morphological investigation, both organs were perfunded with about 5% formalin-solution, and laid into formalin. After a critical diagnosis, the following finding resulted:

Both kidneys were well preserved, K 20 somewhat better than K 19. The rind structures were preserved optimally. Some middle pieces had fresh epithelial necrosis and the formation of homogeneous cylinders. Besides, Henlischeloops occurred in the marrow, which show the same kind of epithelial necrosis and cylinders. In spite of the long time of perfusion, the interstitial edema was limited. The glomerule and the containers were not altered (alternated).

On the whole, also for the pig's kidneys, there were ideal results. Under the circumstances the degree of necrosis of the severed kidneys was not bad for the prognosis taken.

What is claimed is:

1. In a process for conserving isolated organs by the use of low temperatures, characterized in that the organs are rinsed with an inert gas until they are free of water and blood, then the vascular systems for the organs are filled at a slight excess pressure with the inert gas with the vascular openings being closed, the organs then being inserted into a gas tight container having an inert gas atmosphere with a pressure greater than atmospheric being in the container, then the organs in the container are cooled at excess pressure in its inert gas atmosphere to a temperature below −100° C, and finally the organs are stored in the container at this temperature.

2. The process according to claim 1, characterized in that the organs are rinsed and filled with helium.

3. The process according to claim 2, characterized in that the cooling takes place under a nitrogen atmosphere.

4. The process according to claim 2, characterized in that the cooling takes place under an atmosphere of helium.

5. The process according to claim 2, characterized in that the organs are thawed out by irradiation in intervals with microwaves.

6. The process according to claim 5, characterized in that the organ to be conserved is a kidney.

7. The process according to claim 2, characterized in that the hollow spaces of the vascular systems are also filled with the gas.

8. The process according to claim 2, characterized in that the cooling takes place under an atmosphere of xenon.

9. The process according to claim 2, characterized in that the cooling takes place under an atmosphere of sulfur hexafluoride.

10. In a process for preserving meat provisions which may later be thawed and utilized as fresh meat, characterized in that the meat is rinsed with an insert gas, then the vascular systems for the meat are filled at a slight excess pressure with the gas and the vascular openings are closed, the meat is then cooled at excess pressure in an inert gas atmosphere in a gas tight container to a temperature below −100° C, and the meat is stored at this temperature.

11. The process according to claim 10, characterized in that the meat is rinsed with helium.

12. The process according to claim 11, characterized in that the meat is thawed by irradiation in intervals with microwaves.

* * * * *

UNITED STATES PATENT AND TRADEMARK OFFICE
CERTIFICATE OF CORRECTION

PATENT NO. : 4,008,754
DATED : February 22, 1977
INVENTOR(S) : JURGEN KRAUSHAAR, ET AL It is certified that error appears in the above-identified patent and that said Letters Patent are hereby corrected as shown below:

On the cover page after line "[21]" add the following lines: ---

[30] Foreign Application Priority Data

August 6, 1974 Germany ............ P 24 37 812.9

---

*Signed and Sealed this* nineteenth *Day of* July 1977

[SEAL]

Attest:

RUTH C. MASON
*Attesting Officer*

C. MARSHALL DANN
*Commissioner of Patents and Trademarks*